(No Model.) 2 Sheets—Sheet 1.

S. T. WELLMAN & G. W. GOETZ.
PLANT FOR AND PROCESS OF MAKING LIME.

No. 309,270. Patented Dec. 16, 1884.

Witnesses.
J. H. Burridge
C. H. Lumey

Inventors.
S. T. Wellman
G. W. Goetz
W. H. Burridge, Atty (No Model.) 2 Sheets—Sheet 2.

S. T. WELLMAN & G. W. GOETZ.
PLANT FOR AND PROCESS OF MAKING LIME.

No. 309,270. Patented Dec. 16, 1884.

Witnesses. Inventors.

UNITED STATES PATENT OFFICE.

SAMUEL T. WELLMAN AND GEORGE W. GOETZ, OF CLEVELAND, OHIO.

PLANT FOR AND PROCESS OF MAKING LIME.

SPECIFICATION forming part of Letters Patent No. 309,270, dated December 16, 1884.

Application filed October 6, 1883. Renewed June 25, 1884. (No model.)

*To all whom it may concern:*

Be it known that we, SAMUEL T. WELLMAN and GEORGE W. GOETZ, of Cleveland, in the county of Cuyahoga and State of Ohio, have invented a certain Improved Plant or Apparatus for and Mode or Process of Manufacturing Lime of Commerce, of which the following is a specification.

The nature of said invention relates to a plant or apparatus for and process or mode of manufacturing lime from limestone; and it consists of a gas producer or producers and fire-brick chambers or their equivalents in such correlation with the limekiln that the heat generated in the fire-brick chambers is conveyed to the kiln for the purpose of driving off the carbonic acid from limestone, and thus convert it into the lime of commerce. The said producers and chambers are so constructed with air and heat passages or flues connected with the kiln that a current of heated air is constantly being conveyed to the limestone in the kiln, and while one chamber is being exhausted of its heat by passing air through it the other chambers are being heated up to the desired degree, so that as soon as one chamber has lost most of its heat another is ready to supply its place.

Figure 1:
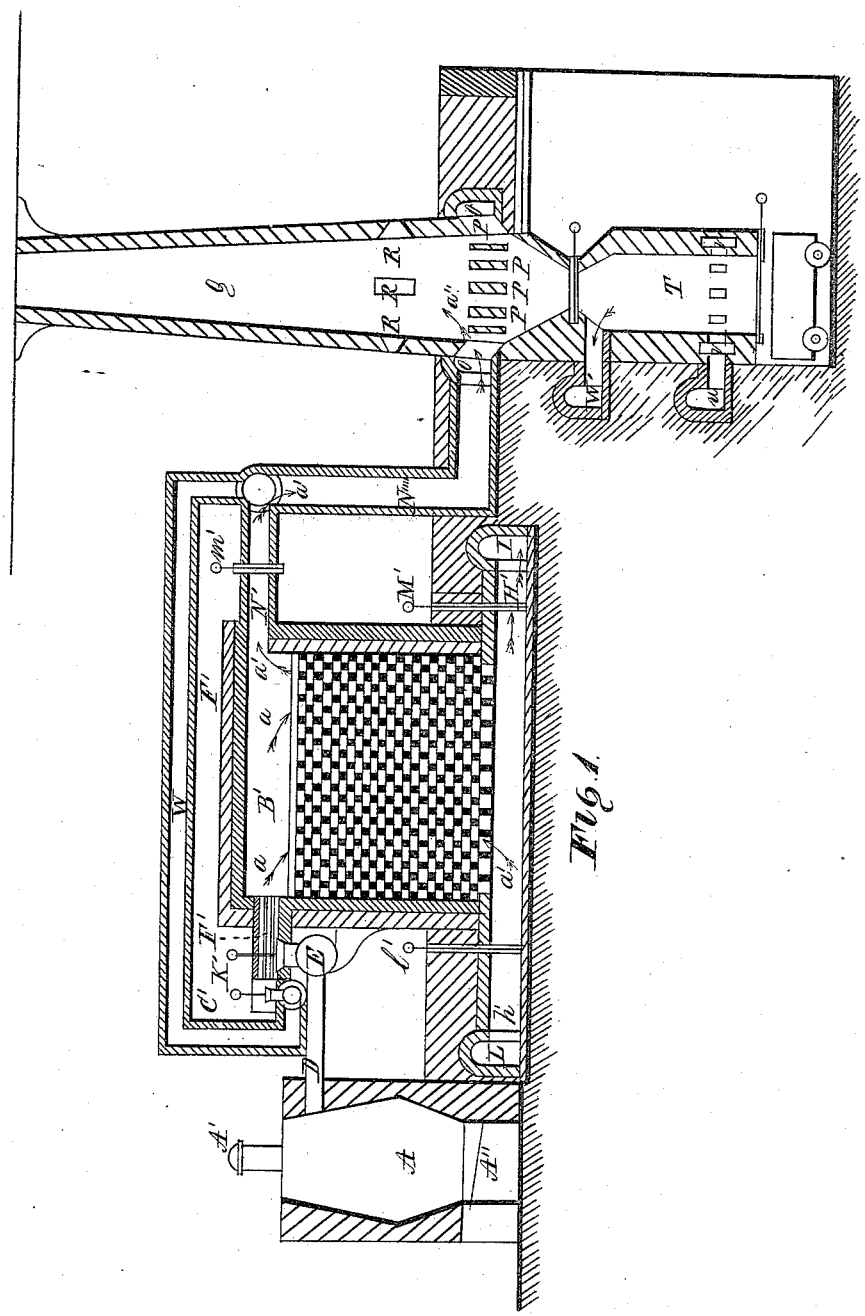
Figure 2:
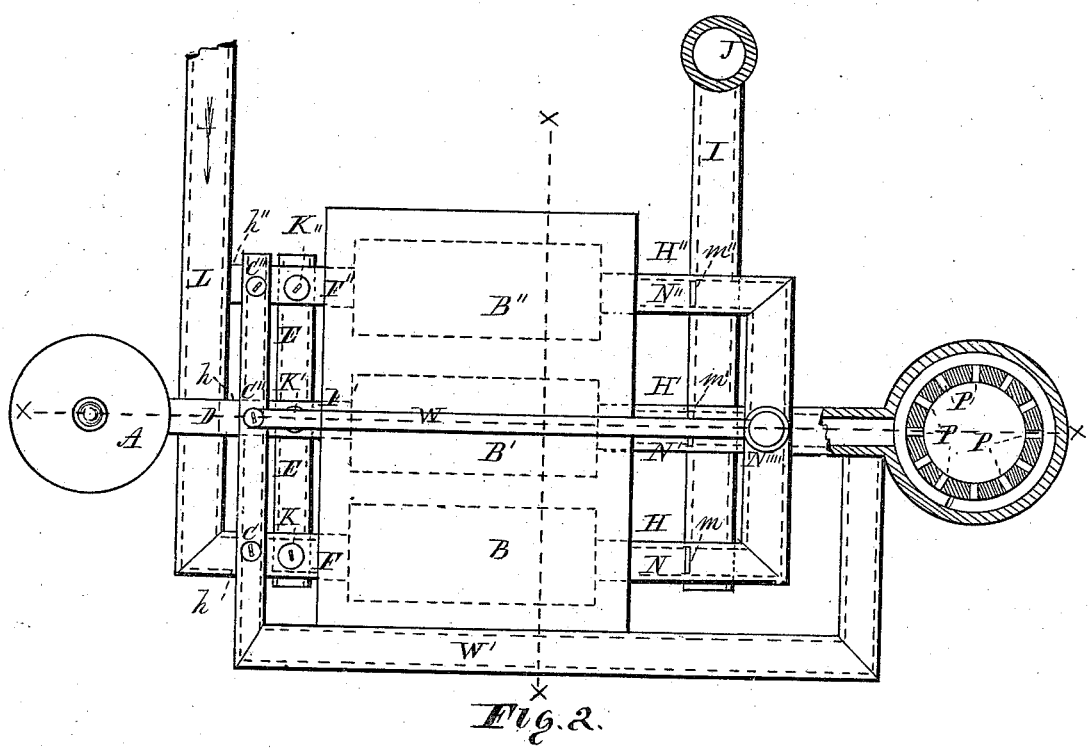
Figure 3:
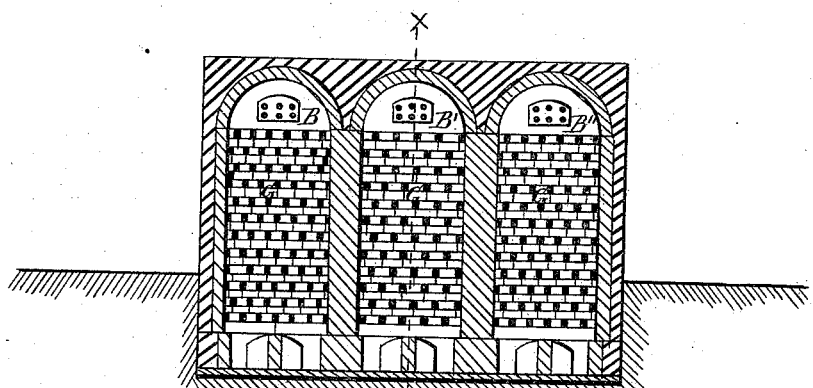

The apparatus or plant herein set forth and described is designed as an example or representation of one form of the means by which the process or mode of converting the carbonate of lime into the lime of commerce is produced. The same mode may be carried out by other appliances or means without departing from the essential feature of our invention—that is, the process of converting the limestone into the lime of commerce by the direct action of heated air to the limestone.
For a more full and complete description of the said plant or apparatus and its mode of operation, reference will be had to the following specification, and to the annexed drawings, making part of the same.
Figure 1 is a vertical longitudinal section in the direction of the line *x x*, Fig. 2. Fig. 2 is a plan view. Fig. 3 is a transverse section in the direction of the line *x' x'* in Fig. 2.

Like letters of reference refer to like parts in the several views.

It is well known that in the art of making lime of commerce for structural and other ordinary purposes it is necessary to burn the limestone with a fuel that does not produce an intense local or concentrated heat, as the lime would be in parts overburned, and thus deteriorate its slaking and cementing qualities. Wood, although a suitable fuel, is becoming too expensive for an economical production of lime. Coal, whether burned direct or converted into gas for burning limestone, contains too much sulphur to produce a good quality of lime, and overburns it easily. Lime containing sulphur does not slake well, and the sulphur causes it to exfoliate when put on a wall in the usual manner.

Practical experience has shown that the lower the degree is at which heat can be employed to expel the carbonic-acid gas from limestone the better will the lime slake and the more the cementing properties be improved.

By means of the improvements and mode or process herein set forth, the carbonic-acid gas is expelled from the limestone without its being brought in contact with products of combustion which contain sulphurous gases, and in order to subject the limestone to any desirable temperature atmospheric air which has been highly heated in a suitable chamber or oven is passed through the limestone in the kiln, and thus a lime is obtained which is free from sulphur, and which was not overheated, which will slake well, and is a strong cementing agent, and not liable to flake off when put on a wall.

In the drawings, A, Figs. 1 and 2, represents a gas producer or generator, which may be one or more and of any suitable form, and in capacity according to the size of the kiln, and to which the hot-air chambers or regenerators B B' B'', Figs. 1 and 3, are adapted. Said chambers are also indicated at B B' B'' in Fig. 2. The producer or generator is provided with suitable grates at A'', Fig. 1, with an ash-pit below, and having a hopper or door, A', through which the fuel is passed into the producer. The gas from the producer passes through the conduit D into the main flue E, and from which it enters the chambers through the branch flues F F' F''. By raising the valve C' hot air is admitted to consume the gas, whereby the said chambers, which are filled with fire-bricks or the equivalent, thereof, and so laid up as to allow a space between them for the passage of the products of combustion to the chimney, as indicated by the arrows $a$, Fig. 1, are heated. In passing through the chambers the heat generated by the burning gases is absorbed by the bricks G therein loosely piled up, as indicated in Figs. 1 and 3. The products of combustion enter bottom flues, H H' H'', below the chambers, into the chimney-conduit I, and pass out through the chimney J, Figs. 1 and 2.

The admission of gas into the chambers is regulated by the valves K K' K''. After one or more of the chambers have been heated up, as described, to the desired degree of heat, a current of air is forced by mechanical means or drawn by natural draft through the main flue L to the bottom flues, $h\ h'\ h''$. On either of the dampers M M' M'' being closed and the damper $l'$ opened, which controls the passage of air to the chambers, and the valve $m'$ opened, the air will then pass up through the heated bricks G, as indicated by the arrows $a'$, and through the respective hot-air flue N, N', or N'' to the diving-flue N'''' into the annular chamber O, Figs. 1 and 2, the outlet from each chamber to the annular chamber O being controlled by the dampers $m\ m'\ m''$. From the annular chamber O the heated air passes through ports P into the interior of the kiln Q, and extends through the limestone therein, thereby heating or burning it and expelling the carbonic acid. By this mode it will be noted that there is a general extension of heat through the entire mass, and not concentrated or local.

In the kiln are openings or holes R, for the purpose of examining the condition of the limestone, and in case of lodgment of the material a bar may be passed through the holes to release any arresting of the limestone in its descent. When the lime is sufficiently burned, on pulling the slide S, it is then discharged from the bottom of the kiln into the lime-pit T. The heat from the lime in this chamber can be utilized in supporting the combustion in the chambers. By mechanical means or otherwise the air is passed to the hot lime in T, through the parts U into a circular flue, V, then through the hot lime into the flue W', Figs. 1 and 2, through the controlling-valves C, C', or C'', and thence through the flue F' into the chamber, where it serves for combustion.

In practical operation it is preferable to have the gases from the producer heating up two chambers while another is giving off the previously received heat in its transmission to the kiln by currents of air passing through the heated bricks in the manner before set forth. Thus a constant current of heated air is conveyed to the kiln; hence while one or more of a series of chambers are being heated one or more chambers are transferring heat to the kiln at the same time. As an illustration of this modus operandi, the chamber B' is supposed to have received its maximum degree of heat as before described, and it is to be conveyed through the flues to the kiln. The valves C' and K' are closed, to stop the combustion, and the damper M' is closed. By raising the dampers $l'$ and $m'$ air can then pass through the heated bricks in B' through the flue N'''' into the kiln. As soon as the air thus obtained is lower in temperature than desired the dampers $l'$ and $m'$ are closed, the damper M' opened, and the valves C' and K' opened, whereby the bricks are reheated. While B' is being reheated, B or B'' is used to obtain hot air. In this manner the kiln is constantly supplied with hot air from one or more chambers.

Instead of obtaining heated air for the gas-combustion from the waste heat of the lime in T, hot air can also be obtained to support the combustion of the gas by connecting the valves C C' C'' with the flue N'''' through the flue W.

We do not confine ourselves to the above-described method of heating the air, as any of the well-known methods of heating air for the manufacture of pig-iron in the blast-furnace can be utilized to supply heated air to expel the carbonic acid from limestone.

What we claim as our invention, and desire to secure by Letters Patent, is—

1. In combination with a limekiln, a gas-producer, A, and two or more heating-chambers provided with conduits or flues arranged in such correlation as to convey gas from the producer to the chamber and heat from the chamber to the kiln, for the purpose set forth.

2. For converting carbonate of lime and magnesia into the lime of commerce, the combination of one or more gas-producers with a series of regenerators or heating-chambers containing fire-brick or the equivalents thereof, and so arranged in connection with a limekiln that a continuous current of heated air will be conveyed to the said kiln from the said chambers, substantially as described, and for the purpose set forth.

3. In combination with a gas-producer, A, a series of heating-chambers so arranged in relation to the said producer and a limekiln that while one or more of said chambers are parting with their heat, which is conveyed to the said kiln, one or more of said chambers are being heated by the gas from the producer or generator passing through conduits or flues to the said reheating-chamber, whereby a continuous current of heated air is conveyed through flues to the limestone in said kiln, substantially as described, and for the purpose set forth.

4. The process or mode of expelling or driving off carbonic-acid gas from limestone to make the lime of commerce by driving or drawing through the limestone air which has been more or less highly heated, as described.

In testimony whereof we affix our signatures in presence of two witnesses.

SAMUEL T. WELLMAN.
GEORGE W. GOETZ.

Witnesses:
W. H. BURRIDGE,
J. H. BURRIDGE.